Nov. 17, 1931.                B. HENNING                1,832,117
                          PIE PAN ATTACHMENT
                       Original Filed June 20, 1930
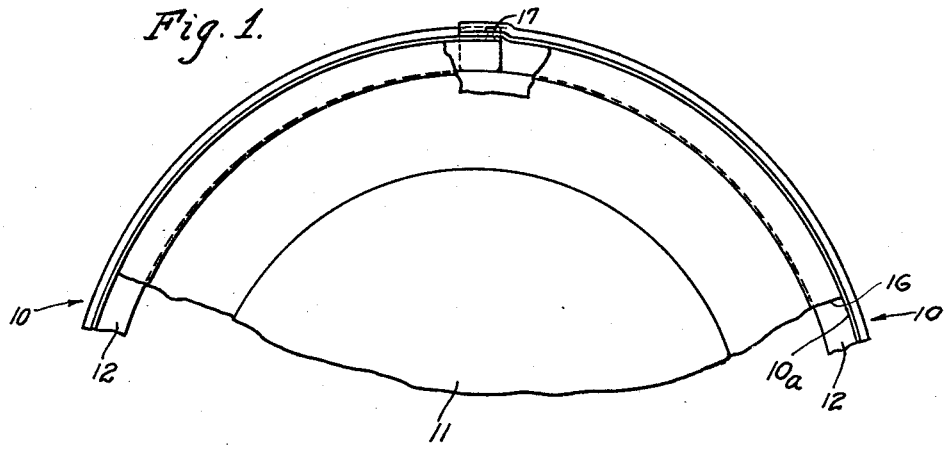
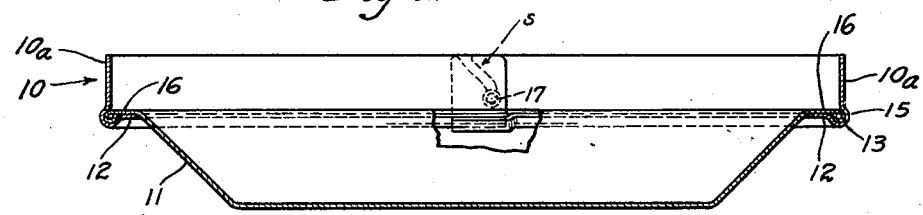
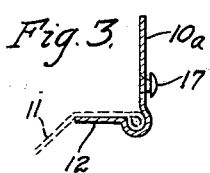 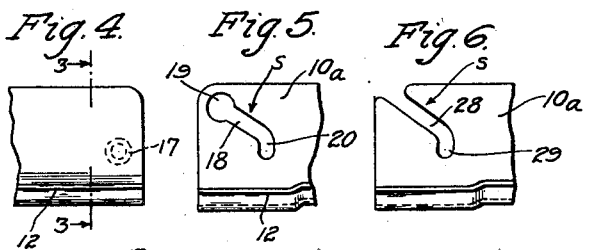 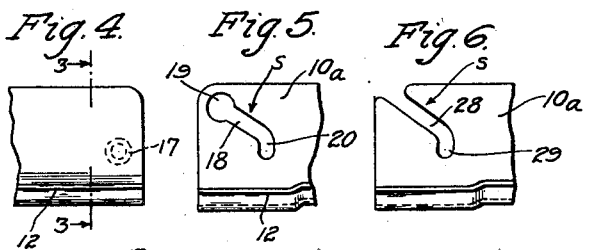 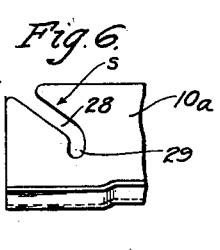
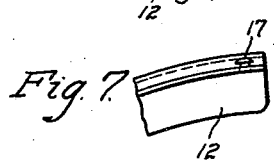 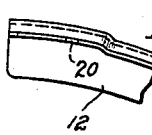
INVENTOR.
Bessie Henning
BY Robt. W. Pearson
ATTORNEYS.

Patented Nov. 17, 1931

1,832,117

UNITED STATES PATENT OFFICE

BESSIE HENNING, OF LOS ANGELES, CALIFORNIA

PIE PAN ATTACHMENT

Application filed June 20, 1930, Serial No. 462,619. Renewed September 28, 1931.

This invention relates to an attachment adapted to be removably secured to cooking utensils used in baking. More particularly the invention pertains to a protecting and retaining ring adapted to be removably attached to a pie pan to prevent the filling of the pie from running over the edge portion of the pan while the pie is being cooked.

An object of the invention is to simplify a pie-protecting device of this kind; to render it more conveniently applicable to and removable from the pie pan; and to generally improve upon the construction of a device of the kind to which the invention pertains.

Another object of the invention is to provide a protecting and retaining ring of the character stated for pie pans, which is adapted more effectively to be clamped around the rim of the pie pan so that a tight fit will result between the ring and the rim of the pie pan, this desirable result being secured by means of an improved cooperating stud and slot construction with which the two ends of the retaining ring are provided.

Among other objects and advantages of the invention are extreme simplicity and durability of construction and very ready adaptability of the retaining ring to be properly put in place upon the pie pan and to be as quickly and effectively removed therefrom after the pie has been baked.

Other objects, advantages and features of invention may hereinafter appear.

Referring to the accompanying drawings which illustrate what is at present deemed to be a preferred embodiment of the invention, Fig. 1 is a plan view of a pie pan having my newly invented attachment secured thereto in position for use, a portion of the pan and attachment being broken away to contract the view.

Fig. 2 is a vertical mid-section of the pan with the attachment secured thereto.

Fig. 3 is a cross section on line 3—3 of Fig. 4.

Fig. 4 is an inside elevational view of one end portion of the pie retaining ring, and Fig. 5 is a like elevational view of the other end portion of said ring.

Fig. 6 is an elevational view of a modification of the end portion of the ring shown in Fig. 5.

Fig. 7 is a plan view of the ring end shown in Fig. 4.

Fig. 8 is a plan view of the ring end shown in Fig. 5.

Referring in detail to the drawings, the pie protecting attachment consists of an annular member 10 preferably formed of a sheet metal strip, and being of a size to fit closely around the circular pie pan 11.

Said ring 10 comprises a body or upstanding port 10a and an inwardly directed bottom flange 12 which is shown united to the body portion of the ring by a swell or outcurved portion 13 which is adapted to fit closely around the curl 15 of the pie pan flange 16.

The annular member 10 is illustrated as a sheet metal strip which is curved to adapt it to conform to the periphery of the pie pan 11, one end of said strip being provided with a headed stud 17, and the other end portion thereof being provided with a cam slot $s$ having a central body portion 18 inclined as shown in Fig. 6, an enlarged head portion 19 at one end and a deflected short portion 20 at the other end. Said head 19 of said slot is of slightly greater diameter than the head of the stud 17, the portions 18 and 20 of said slot being only of slightly greater width than the diameter of the neck portion of said stud.

It will further be observed that the slot $s$, as seen in Fig. 6 and considered from its head portion 19 toward its other end, has its portion 18 inclined away from the end edge of the adjacent end of the ring 10, while the terminal portion 20 of said slot is slightly inclined toward said end edge of the ring 10. Owing to the form of slot which has just been described, the stud 17 may have its head inserted through the enlarged portion 19 of the slot from the concave or inner side of the ring 10, and then with the two overlapping ends of the ring in contact, the ring having previously been put in approximately the proper position for keeping the pie crust in place, the neck portion of the stud 17 will be forced down along the cam portion 18 of the slot *s* until said stud reaches the reversely inclined terminal portion 20 of said slot. When this point is reached by the stud, owing to the reverse inclination of the slot portion 20, said stud will quickly spring down to the extreme end of the slot, thus forming an effective locking means for keeping the protecting ring in place around the periphery of the pie pan.

With regard to the form of the slot shown in Figs. 1 and 6 which cooperates with the cam portion 28 of the slot, it opens out through the side edge of the strip body 10*a* near one end thereof instead of terminating in an enlargement located in spaced relation to the corner portion of said strip. Owing to the mouth of said slot being located at the side edge of the strip 10, a longer cam edge of slot is provided to cooperate with the neck of the stud than would result if the slot opened out at the end of strip 10. The inner end of said slot 28 is deflected at 29 in the same manner as the slot portion 20 of Fig. 5.

After the pie has been placed in the pan preparatory to baking and the edges thereof have been trimmed, the strip 10, with its ends spaced a short distance apart, is positioned around the periphery of the pie pan, and the neck of the stud 17 is then slipped into the mouth of the slot 28, assuming that the form of the invention illustrated in Figs. 1 and 6 is being used. Then the stud is forced down through the long limb 28 of the slot *s* until it enters the inner limb 29 of said slot. This causes the end portions of the device to be drawn together and also causes the device as a whole to grip the pie pan securely. The removal of the device from the pie pan will be accomplished by a reverse operation.

When the form of slot shown in Fig. 5 is adopted the operation will be the same except that the head of the stud 17 will be inserted into and removed from the enlarged portion of the slot.

Claims:

1. An attachment for pie pans comprising a strip of sheet metal which is curved to adapt it to conform to the periphery of a circular pie pan, one end of said strip being provided with a slot which is cut into said strip, said slot having a cam portion and a locking portion, the other end of said strip being provided with a stud having a head of greater diameter than the width of said slot and having a neck portion adapted to ride on the camming surface of said slot, one end of said slot being adapted to receive said stud, said stud and slot being positioned to cooperate with each other to decrease the diameter of the strip and to retain said strip of metal in place gripped around the periphery of the pie pan.

2. An attachment for pie pans comprising a strip of sheet metal which is curved to adapt it to conform to the periphery of a circular pie pan, one end of said strip being provided with a slot which is cut into said strip, said slot having a cam portion and a locking portion, the other end of said strip being provided with a stud adapted to ride on the camming surface of said slot, one end of said slot opening out at the side edge of said strip to receive said stud, said stud and slot being positioned to cooperate with each other to decrease the diameter of the strip and to retain said strip of metal in place gripped around the periphery of the pie pan.

3. An attachment for pie pans comprising a strip of sheet metal which is curved to adapt it to conform to the periphery of a circular pie pan, one end of said strip being provided with a stud which projects laterally therefrom, the other end of said strip being provided with a slot which is cut into said strip and which has two limbs which are angularly related to each other, the edge of one limb of said slot forming a cam on said stud which is adapted to ride to decrease the diameter of said strip thereby to clamp said strip of metal around the pie pan, and the other limb of said slot being adapted to retain said strip in place upon the pie pan.

In testimony whereof I hereunto affix my signature.

BESSIE HENNING.